J. KOETSCHET.
PROCESS AND APPARATUS FOR CARRYING OUT CHEMICAL REACTIONS BY CATALYSIS.
APPLICATION FILED APR. 26, 1919.
1,400,959.
Patented Dec. 20, 1921.
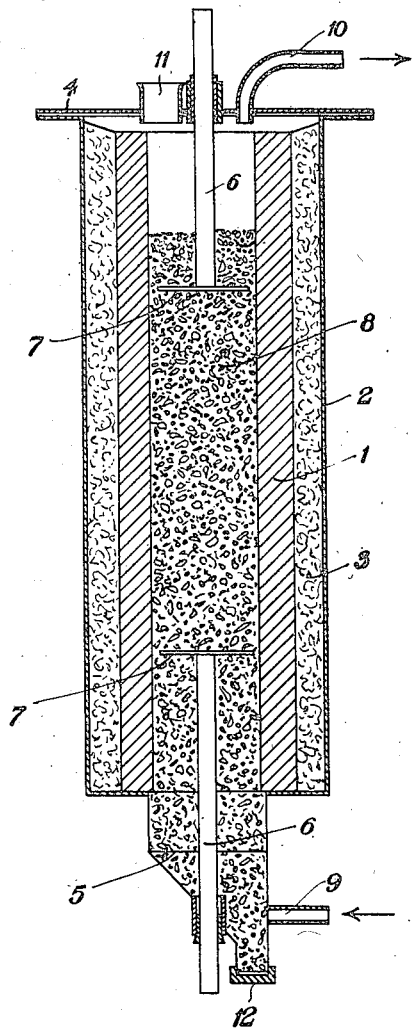
Inventor
Joseph Koetschet
By Wm Wallace White
Attorney

UNITED STATES PATENT OFFICE.

JOSEPH KOETSCHET, OF LYON, FRANCE, ASSIGNOR TO SOCIETE CHIMIQUE DES USINES DU RHONE, ANCIENNEMENT GILLIARD, P. MONNET ET CARTIER, OF PARIS, FRANCE.

PROCESS AND APPARTAUS FOR CARRYING OUT CHEMICAL REACTIONS BY CATALYSIS.

1,400,959.   Specification of Letters Patent.   Patented Dec. 20, 1921.

Application filed April 26, 1919. Serial No. 292,947.

*To all whom it may concern:*

Be it known that I, JOSEPH KOETSCHET, a citizen of the Swiss Republic, residing at Lyon, France, have invented certain new and useful Processes and Apparatus for Carrying Out Chemical Reactions by Catalysis, of which the following is a specification.

This invention relates to processes and apparatus for carrying out chemical reactions between gases in the presence of a catalyst, and particularly to the processes where the required temperature is solely obtained by the passage of an electric current through a granular or otherwise divided resistance material, and has for its object to provide an improved process of this kind, adapted to be carried out on a commercial scale and enabling considerable economy in material to be realized.

The heating of catalysts by the passage of an electric current through metallic or other electric resistances consisting of one or more distinct units in limited number is well known, said units being made in one solid piece each, such as a tube or coil which may have a catalytic effect of itself, or which acts as a heater to bring the catalysts and the reacting gases to the required temperature; the use of electrically heated granular resistance as auxiliary reaction or contacting material in combination with an electrically heated molten non-metallic bath as a principal source of heat is also known.

I am also aware that it has been proposed to consume the smoke and exhaust waste gases from internal combustion engines either by the heat of an electric arc or by passing the smoke and waste gases through a chamber heated to a high temperature by an electrical resistance consisting of granular carbon or other metallic or non-metallic pulverized resistance material best adapted for attaining a high temperature by an electrical resistance consisting of granular carbon or other metallic or non-metallic pulverized resistance material best adapted for attaining a high temperature, no catalytic action being desired.

According to this invention, I employ granulated coke, powdered charcoal and alumina or other catalysts in a state of fine division, or a mixture of a suitable granulated resistance material with such catalysts, and raise the mass to a uniform temperature, suited for the catalytic reaction in progress, by the passage of an electric current through said mass without any other auxiliary source of heat.

A process is thereby provided enabling chemical reactions to be effected by catalysis, the characterizing feature of which process being that the gaseous substances which are to be transferred are made to pass through a homogeneous mass capable simultaneously of being uniformly heated to an easily and accurately regulated temperature by the passage of an electric current through the said mass, without the use of independent resistance heaters or the like, whether solid or liquid, and of promoting chemical reactions by catalysis, the said mass thus fulfilling the combined parts of heating resistance and of catalyzer. It is to be understood that where vapors are treated, some extraneous heat is used in their production, the temperature attained being lower than that maintained in the catalytic process; and that when the reaction is an exothermic one, the heat evolved, of course, assists in maintaining the temperature desired during the catalytic action.

The heating produced by the passage of the current in the mass, which is employed in such a state of division that it offers a large contact surface to the reacting gases, is utilized to bring this mass and the gases which traverse it to the temperature at which the reaction takes place and for maintaining this temperature if the reaction is endothermic.

The invention also relates to the electric furnace adapted for carrying out the above process, the said furnace having for characteristic feature the arrangement within a non-conducting sheath or tube of a conducting and catalyzing homogeneous mass which can be traversed by gases.

The accompanying drawing is a vertical section illustrating an embodiment of an oven for carrying out the invention.

The particular construction of the oven illustrated in the figure comprises a non-electrically conducting sheath of refractory material 1, surrounded by a metallic casing 2, the annular space between the said sheath and casing being filled with a thermally insulating substance 3 such as kieselguhr. A cover 4 and a bottom receptacle 5 are secured to the metallic casing by suitable means and carry electrodes 7 carried on rods 6 and adjustable in position. The cylindrical space within the sheath 1 is filled with the homogeneous mass 8 which acts as a resistance heater and a catalyst. Inlet and outlet tubes, 9 and 10, for the gases which it is desired to bring into reaction and for the resulting gaseous compounds are provided in the bottom receptacle and the cover respectively, these carrying also apertures 11 and 12 for the introduction and the withdrawal of the catalytic resistance material, respectively. Means not shown are provided for adjusting the intensity of the electric current and thereby the temperature of the heated zone.

The catalyzing substance may itself be the electric conductor, but where this is not the case some powdered or granulated or otherwise divided partially conducting matter may be incorporated with the said substance so as to constitute a thoroughly well mixed mass or else fragments of a catalyst and of a conducting material may simply be mixed together so as to form such a thoroughly mixed mass as will act as a resistance heater.

In order to obtain a uniform temperature in the catalyst, the walls of the furnace must not be a conductor of electricity and no metallic or other electric resistance heater should be embedded in the catalyst, which is intended to act as a unique and uniform electrical conductor.

From this arrangement results a great regularity in the reaction, a great division of the gaseous masses, their intimate contact with the catalyst, the maintenance of every portion of the catalyst at a uniform temperature, which is specially important for endothermic reactions, a perfect utilization of the catalyst, and lastly the localization of the gaseous reactions in limited spaces with conducting and active walls, represented by the spaces between the granules or particles of the catalyst; this, specially in the case of certain exothermic reactions, eliminates any local elevation of temperature and does away with any risk of explosion.

*Example I*.—The electric conductor acting at the same time as a catalyst in the form of granulated coke is placed in a non-conducting cylindrical tube and is raised to the temperature of 100° C. by the passage of an electric current and through the tube is passed a mixture of air and acetaldehyde which thus is transformed into acetic acid.

*Example II*.—The electric conductor, consisting of granules of powdered charcoal and alumina is introduced into a non-conducting cylindrical tube and is raised to the temperature of 360° C. by the passage of the electric current. Through the electric furnace so constructed is passed alcohol vapor, the temperature being maintained at 360° C. by the passage of the current. The alcohol is substantially transformed into a mixture of ethylene and of water vapor.

*Example III*.—The same electric furnace as above described in example II is heated at 460° C. by the passage of the electric current and through it is passed acetic acid vapor, the temperature being maintained at 460° C. by the passage of the electric current. The acetic acid is substantially transformed into acetone and carbonic acid.

*Example IV*.—The conducting catalytic mass is constituted by coke granules powdered with alumina and the same vapors as in examples II and III are passed through it at the temperatures indicated, producing the same result as before.

*Example V*.—The conducting catalytic mass is constituted by a mixture of granulated coke and of alumina granules.

The simultaneous employment of the mass as electric conductor and as catalyst, which forms the basis of the invention, allows the heat produced by the passage of the current to be completely utilized for the chemical reaction promoted by the catalyst.

It is to be understood that the nature, the chemical constitution, and the physical condition of the conducting and catalyst mass may be considerably varied without exceeding the scope of the present invention.

The same is to be understood as regards the shape, the dimensions, and the details of construction of the apparatus within which the reactions are carried out, which apparatus may be adapted for the most varied and most important industrial applications.

What I claim and desire to secure by Letters Patent is:—

1. The process of producing gaseous chemical reactions by catalysis, which consists in passing the reacting gases through a uniformly heated zone formed solely by a thoroughly mixed mass of divided substances, said mass being formed of material adapted to promote chemical reactions by catalysis and to be heated solely by the passage of an electric current through said mass to a uniform temperature suited for the catalytic reaction without any other auxiliary source of heat except that furnished by the reacting gases themselves, the said divided mass thus performing the combined functions of a heating resistance and a catalyst.

2. An apparatus for producing gaseous chemical reactions by catalysis, comprising a non-electrically conducting sheath, a mass of divided and thoroughly mixed substances within said sheath and forming therein a uniformly heated zone, said mass being adapted to permit the passage of the reacting gases therethrough and to act as a heating resistance and a catalyst, the temperature of the said heated zone being capable of exact regulation without the use of any other auxiliary source of heat except that furnished by the reacting gases themselves.

In witness whereof I have hereunto signed my name in the presence of two subscribing witnesses.

JOSEPH KOETSCHET.

Witnesses:
RICHARD G. VREOUGES,
ERLE M. RACEY.